US 9,409,727 B2

(12) United States Patent
German et al.

(10) Patent No.: US 9,409,727 B2
(45) Date of Patent: Aug. 9, 2016

(54) CONVEYOR MERGE ASSEMBLY

(71) Applicant: Dematic Corp., Grand Rapids, MI (US)

(72) Inventors: H. Thad German, Belding, MI (US);
David M. Berghorn, Grand Rapids, MI (US); Matthew T. Brayman, Ada, MI (US); James P. Johnson, Rockford, MI (US); Bruce E. Taylor, Morley, MI (US); William P. Bray, Spring Lake, MI (US)

(73) Assignee: Dematic Corp., Grand Rapids, MI (US)

( * ) Notice: Subject to any disclaimer, the term of this patent is extended or adjusted under 35 U.S.C. 154(b) by 0 days.

(21) Appl. No.: 14/291,386

(22) Filed: May 30, 2014

(65) Prior Publication Data
US 2014/0353122 A1 Dec. 4, 2014

Related U.S. Application Data

(60) Provisional application No. 61/829,765, filed on May 31, 2013.

(51) Int. Cl.
*B65G 47/72* (2006.01)
*B65G 47/68* (2006.01)
*B65G 13/10* (2006.01)
*B65G 13/11* (2006.01)

(52) U.S. Cl.
CPC .............. *B65G 47/681* (2013.01); *B65G 13/10* (2013.01); *B65G 13/11* (2013.01)

(58) Field of Classification Search
CPC ...... B65G 47/68; B65G 47/681; B65G 47/71; B65G 21/2063; B65G 21/2072; B65G 21/2081

USPC ................. 198/601, 860.1, 370.02, 370.09, 198/370.01, 370.1, 583
See application file for complete search history.

(56) References Cited

U.S. PATENT DOCUMENTS

| 1,815,549 | A |   | 7/1931  | Dietz |
| 2,366,279 | A |   | 1/1945  | Mitchell |
| 2,627,960 | A | * | 2/1953  | Eberle ...................... 193/35 TE |
| 2,901,083 | A |   | 8/1959  | McGrath |
| 3,643,781 | A | * | 2/1972  | Risley ................ B65G 21/2072 |
|           |   |   |         | 198/599 |
| 4,526,266 | A |   | 7/1985  | Dietz |
| 6,811,018 | B2 |  | 11/2004 | Cotter et al. |

(Continued)

FOREIGN PATENT DOCUMENTS

GB 2123375 A 2/1984

OTHER PUBLICATIONS

International Search Report and Written Opinion of the International Searching Authority from corresponding Patent Cooperation Treaty (PCT) Application No. PCT/US2014/040249, mailed Dec. 4, 2014.

*Primary Examiner* — William R Harp
(74) *Attorney, Agent, or Firm* — Gardner, Linn, Burkhart ad Flory, LLP

(57) ABSTRACT

A conveyor assembly comprising a main conveyor having a first side frame and a second side frame, with the first and/or second side frames including a side portion and a support surface. One or more input conveyors having a discharge end are joined to the main conveyor with a bottom portion of the discharge end being positioned on the support surface whereby the input conveyors are accurately mounted in close proximity to the main conveyor to promote the conveyance of items from the input conveyors onto the main conveyor.

32 Claims, 13 Drawing Sheets

(56) References Cited

U.S. PATENT DOCUMENTS

| | | | |
|---|---|---|---|
| 6,871,737 B2 * | 3/2005 | Ertel | B65G 21/06 198/813 |
| 7,093,709 B2 | 8/2006 | Cotter et al. | |
| 7,234,588 B1 | 6/2007 | Buxton | |
| 7,422,098 B2 | 9/2008 | Bonham et al. | |
| 7,556,144 B2 | 7/2009 | Cotter et al. | |
| 7,861,849 B2 | 1/2011 | Fourney | |
| 8,397,897 B2 | 3/2013 | Bastian, II et al. | |
| 8,474,596 B2 * | 7/2013 | Wolkerstorfer et al. | 198/370.09 |
| 2013/0126300 A1 * | 5/2013 | Wolkerstorfer et al. | 198/370.09 |

* cited by examiner

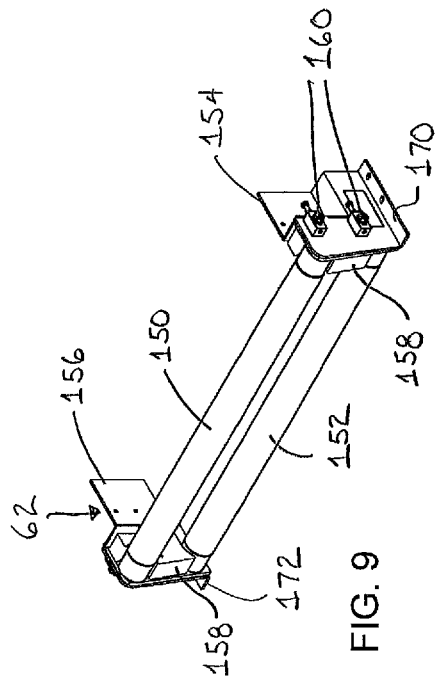
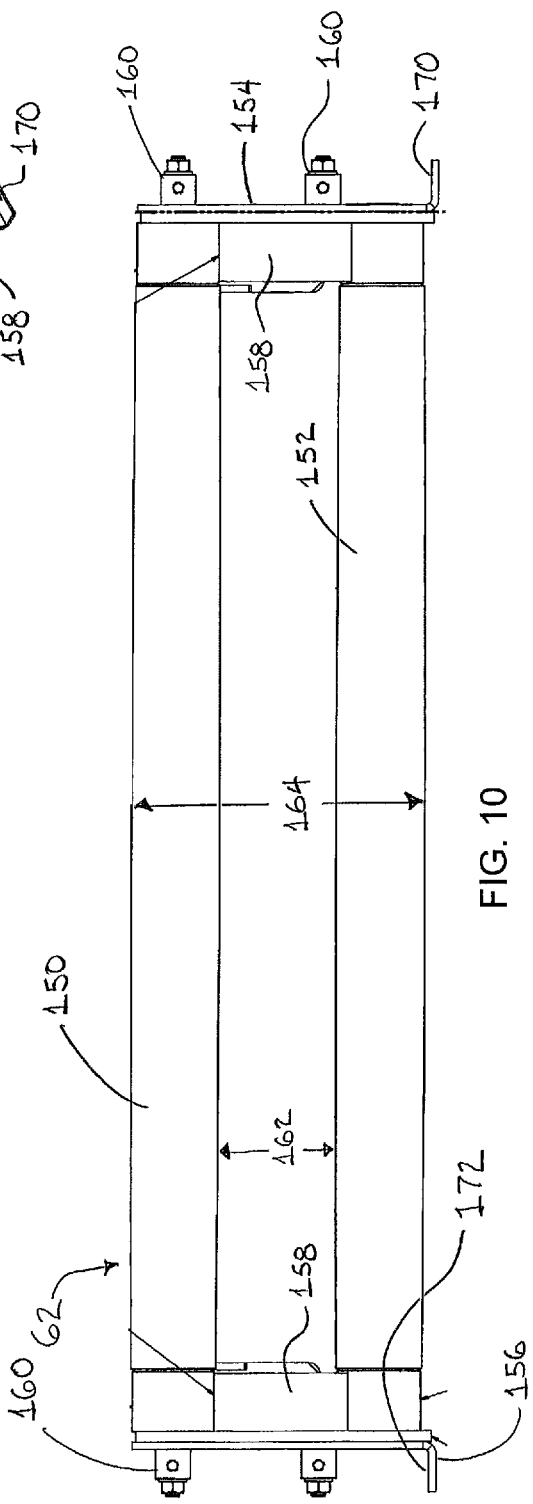
FIG. 9
FIG. 10

CONVEYOR MERGE ASSEMBLY

CROSS REFERENCE TO RELATED APPLICATION

The present application claims priority of U.S. provisional application Ser. No. 61/829,765 filed May 31, 2013, for CONVEYOR MERGE ASSEMBLY, which is hereby incorporated herein by reference in its entirety.

BACKGROUND OF THE INVENTION

The present invention is directed to a conveyor and a conveyor merge assembly, and in particular to a belt conveyor with one or more roller conveyor inputs, as well as to a belt for use with a belt conveyor.

Conveyor merge assemblies involve conveying items, such as packages, containers, or the like, from input conveyors onto a moving main conveyor for further distribution, such as for order fulfillment or warehousing. The input conveyors may be located on both longitudinal sides of the main conveyor, which may be constructed as a belt conveyor, with the input conveyor orientation being angled relative to the main conveyance direction. The items input onto the main conveyor are then subsequently discharged or removed from the main conveyor at a desired location.

SUMMARY OF THE INVENTION

The present invention provides a conveyor and a conveyor merge assembly. A main belt conveyor includes side support surfaces formed as ledges upon which input conveyors, such as roller conveyors, may be received. The support surface provides accurate alignment and enables the end of the input conveyors to be mounted proximate the belt of the belt conveyor to create substantial continuity of conveying surfaces and thereby promote the transfer of items conveyed from the input conveyor to the belt conveyor.

According to an aspect of the present invention, a conveyor assembly comprises a main conveyor and an input conveyor having a discharge end mounted to the main conveyor. The main conveyor includes first and second side frames with the first side frame including a side portion and a support surface. The discharge end of the input conveyor includes a bottom portion that is positioned on the support surface when the discharge end of the input conveyor is mounted to the first side frame of the main conveyor.

The main conveyor may be a belt conveyor with one or more roller input conveyors mounted to the first side of the belt conveyor. Still further, the second side of the main conveyor may also include a side portion and a support surface, with the discharge ends of one or more roller input conveyors mounted thereto in like manner. In particular embodiments the belt conveyor includes a top surface extending between the first and second side frames with the belt being moveable over the top surface and having first and second edges defining a width of the belt, and with the support surface being vertically lower than the top surface and extending outwardly from the first side frame beyond the top surface. The support surface may be constructed as a support wall defining a ledge, and may be generally orthogonally oriented relative to the conveyor.

The side frames may be defined by one or more elongate side channels and may further include an upper flange over which the top surface of the conveyor extends, and the top surface may be defined by one or more panel members. The flange may extend outwardly relative to a side wall of the side frame. The bottom portion of the discharge ends of the input conveyors may be defined by bottom surfaces of side rails of the input conveyors that are mounted on the support surfaces of the main conveyor side frames.

A belt for use with the main conveyor or alternative belt conveyors includes a central portion and a pair of side portions, with the central portion having a higher coefficient of friction relative to the side portions and therefore providing greater frictional surface resistance. The belt comprises a multi-layer belt with the central and side portions in a top layer of the belt.

A main conveyor may alternatively be provided with a guard assembly, where when employed with input conveyors the guard assembly may extend to the input conveyors. In the case of a main belt conveyor, the guard assembly is mounted adjacent to and extends along the side frame, with the guard assembly including a guard member located inwardly above the top surface of the main conveyor. The guard member may also be located inwardly above the edge of the belt and may be formed as a generally vertically oriented guard surface, such as an elongate guard rail. Still further, the guard assembly may further include one or more guide members, such as rollers or bearings, against which the edge of the belt contacts.

Additionally or alternatively, the belt conveyor may include an end pulley assembly at the discharge or input ends of the conveyor, where the end pulley assembly has vertically spaced top and bottom rollers around which the belt travels. The top and bottom rollers have parallel axes of rotation with the axis of rotation of said top roller being positioned vertically higher than the axis of rotation of said bottom roller. The axis of rotation of the top roller may also be positioned outwardly further than the axis of rotation of the bottom roller.

The conveyor assembly of the present invention enables input conveyors to be accurately mounted in close proximity to the main conveyor, thereby promoting the conveyance of items from the input conveyors onto the main conveyor. Moreover, a belt conveyor configured with the end pulley assemblies in accordance with another aspect of the invention enables the conveyor to be axially aligned with another conveyor, such as another belt conveyor, with a minimized gap in the conveying plane of the two associated belts.

These and other objects, advantages, purposes and features of this invention will become apparent upon review of the following specification in conjunction with the drawings.

BRIEF DESCRIPTION OF THE DRAWINGS

FIG. 2A is a side elevation view of the conveyor assembly of FIG. 1:

FIG. 9 is a perspective view of an end pulley assembly of the main conveyor of FIG. 1 shown separated from the conveyor;

FIG. 10 is an end elevation view of the end pulley assembly of FIG. 9; and

DESCRIPTION OF THE PREFERRED EMBODIMENTS

Figure 1:
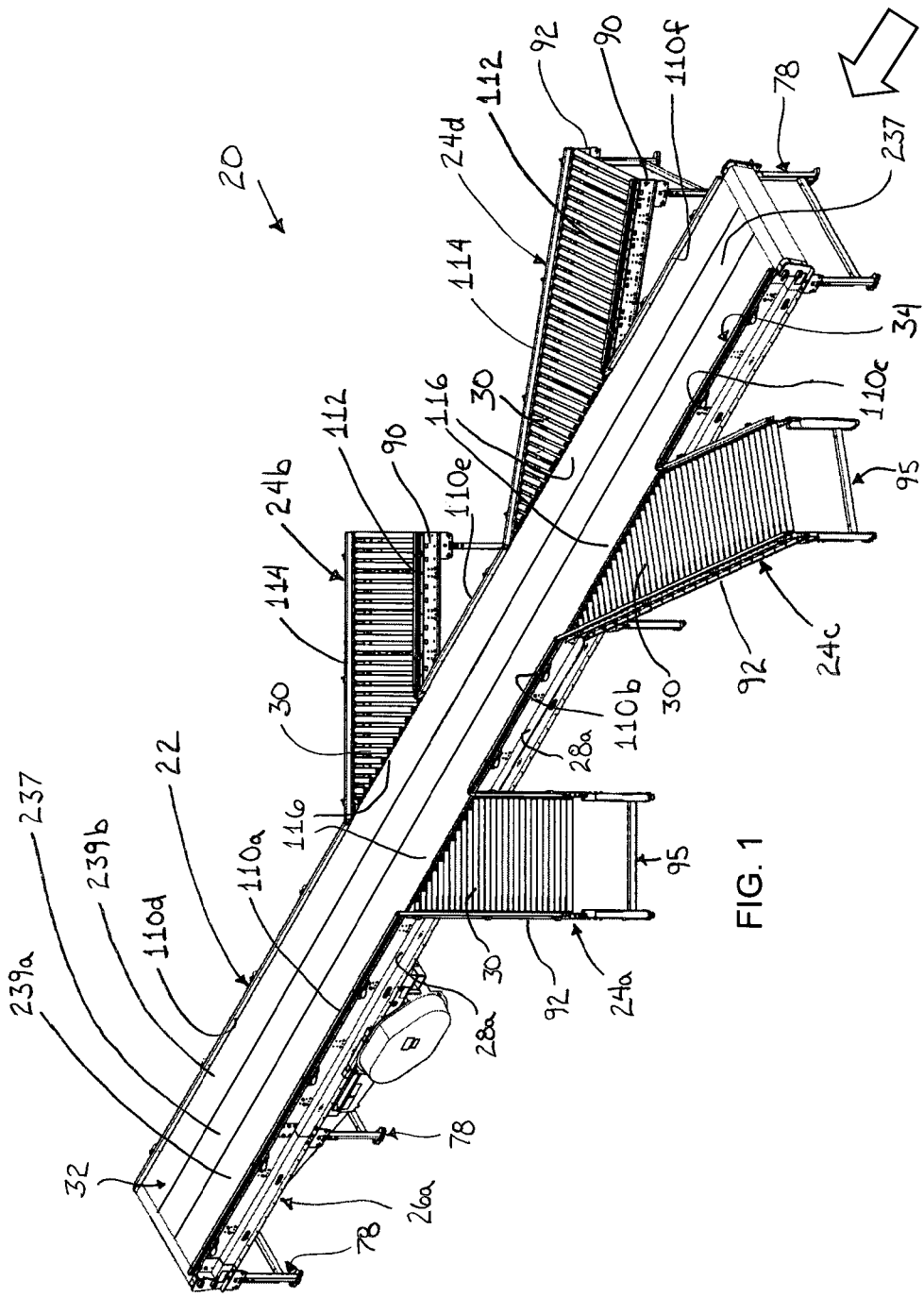
FIG. 1 is an overhead perspective view of a conveyor assembly in accordance with the present invention showing input conveyors merging with a main conveyor.
Figure 2:
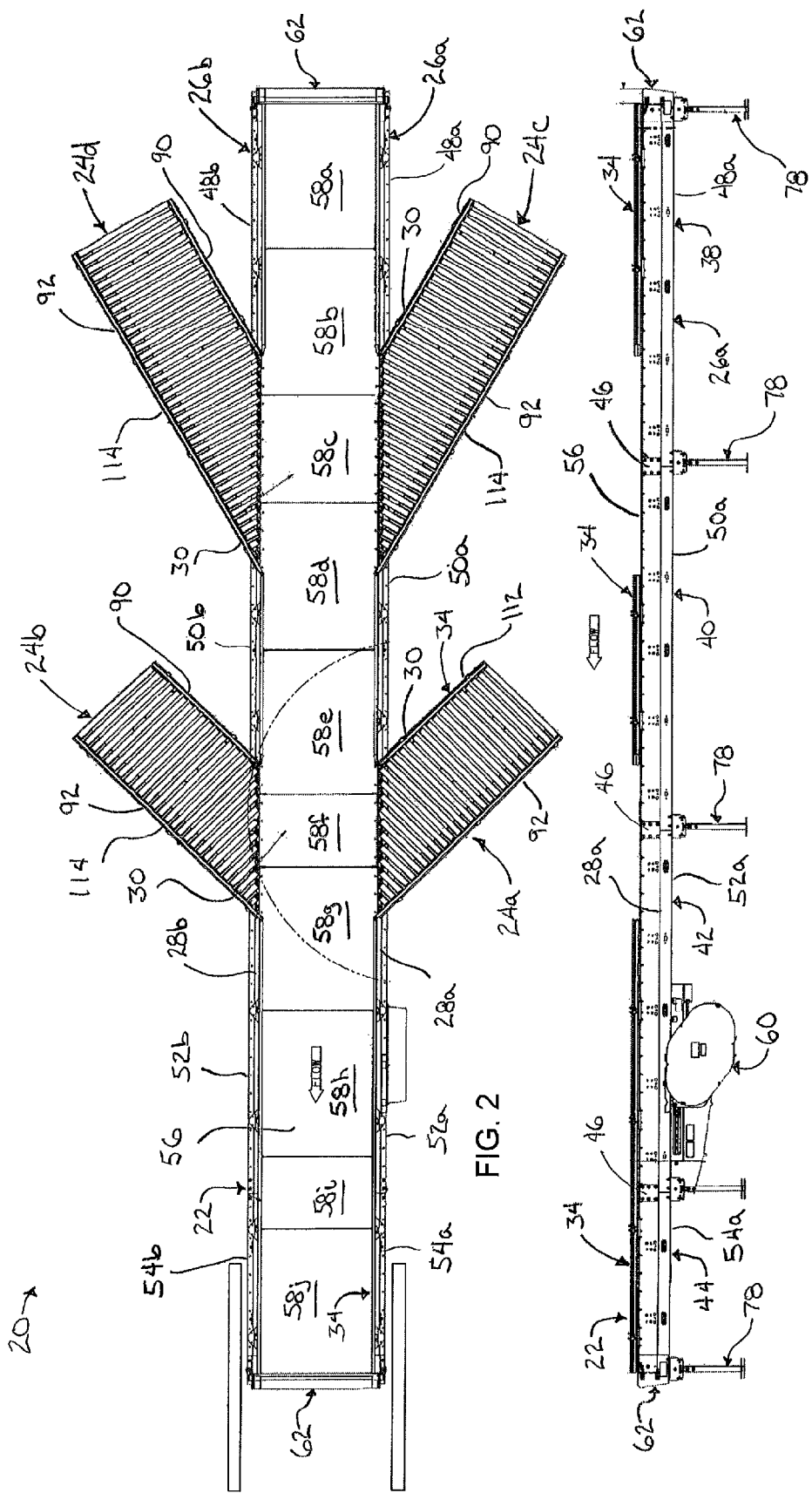
FIG. 2 is a top plan view of the conveyor assembly of FIG. 1.

The present invention will now be described with reference to the accompanying figures, wherein the numbered elements in the following written description correspond to like-numbered elements in the figures. As shown in FIGS. 1 and 2, a conveyor assembly 20 is shown that includes a main conveyor configured as a belt conveyor 22 and multiple input conveyors comprising roller conveyors 24$a$, 24$b$, 24$c$ and 24$d$, where the input conveyors are configured to deliver items to belt conveyor 22 in the manner of a merge conveyor system. Belt conveyor 22 includes side frames 26$a$, 26$b$ that include an integral support surface 28$a$, 28$b$ formed as a ledge in side frames 26$a$, 26$b$, respectively. The roller conveyors 24$a$, 24$b$, 24$c$, 24$d$ each include a discharge end 30 that are mounted on the respective support surfaces 28$a$, 28$b$ of belt conveyor 22. Accordingly, as discussed in detail below, roller conveyors 24$a$, 24$b$, 24$c$, 24$d$ are accurately aligned with belt conveyor 22 with discharge ends 30 being positioned in substantial proximity to the belt 32 of belt conveyor 22. This accurate and proximate connection aids in reducing any gap between the belt 32 and the roller conveyors 24$a$, 24$b$, 24$c$, 24$d$, thereby providing substantial continuity between the conveying surfaces and improving the delivery of items from conveyors 24 onto belt conveyor 22.

As also discussed below, conveyor assembly 20 further includes a guard assembly 34 extending along the sides of the belt conveyor 22 and roller conveyors 24 to aid in maintaining items on the conveyors. Guide members, which in the illustrated embodiment comprise rollers or roller bearings 36 (FIG. 4) are also provided at the sides of belt conveyor 22 that contact and aid in maintaining the position of the belt 32 on belt conveyor 22 and promote or enable belt 32 to extend outwardly toward the sides of belt conveyor 22 to further minimize any gap between the belt 32 and roller conveyors 24$a$, 24$b$, 24$c$, 24$d$.

Referring to FIG. 2A, main conveyor 22 in the illustrated embodiment is shown to comprise a first end section 38, a pair of intermediate sections 40 and 42, and a second end section 44, where the various sections are joined together using connecting plates 46, such as by being bolted together. As also understood from FIG. 2A, side frame 26$a$ is formed by the interconnection of side channels 48$a$, 50$a$, 52$a$, and 54$a$ of the respective first end section 38, intermediate sections 40, 42, and second end section 44, where the side channels have similar cross sectional profiles, but may be of alternative lengths. Similarly, side frame 26$b$ is formed by the interconnection of corresponding opposite side channels 48$b$, 50$b$, 52$b$, and 54$b$ for the various sections, where the side channels forming side frame 26$b$ are substantially mirror image structures of the side channels forming side frame 26$a$.

As shown in FIG. 2, belt conveyor 22 further includes a top surface 56 defining a slider bed over which belt 32 travels to convey items, where top surface 56 in the illustrated embodiment is defined by multiple panel members 58$a$-58$j$ that are affixed between side frames 26$a$, 26$b$. A drive train assembly 60 is mounted to conveyor 22 for driving belt 32, with end pulley assemblies 62 being located on either end of conveyor 22, where belt 32 travels around end pulley assemblies 62 when its travel direction is reversed.

Figure 7:
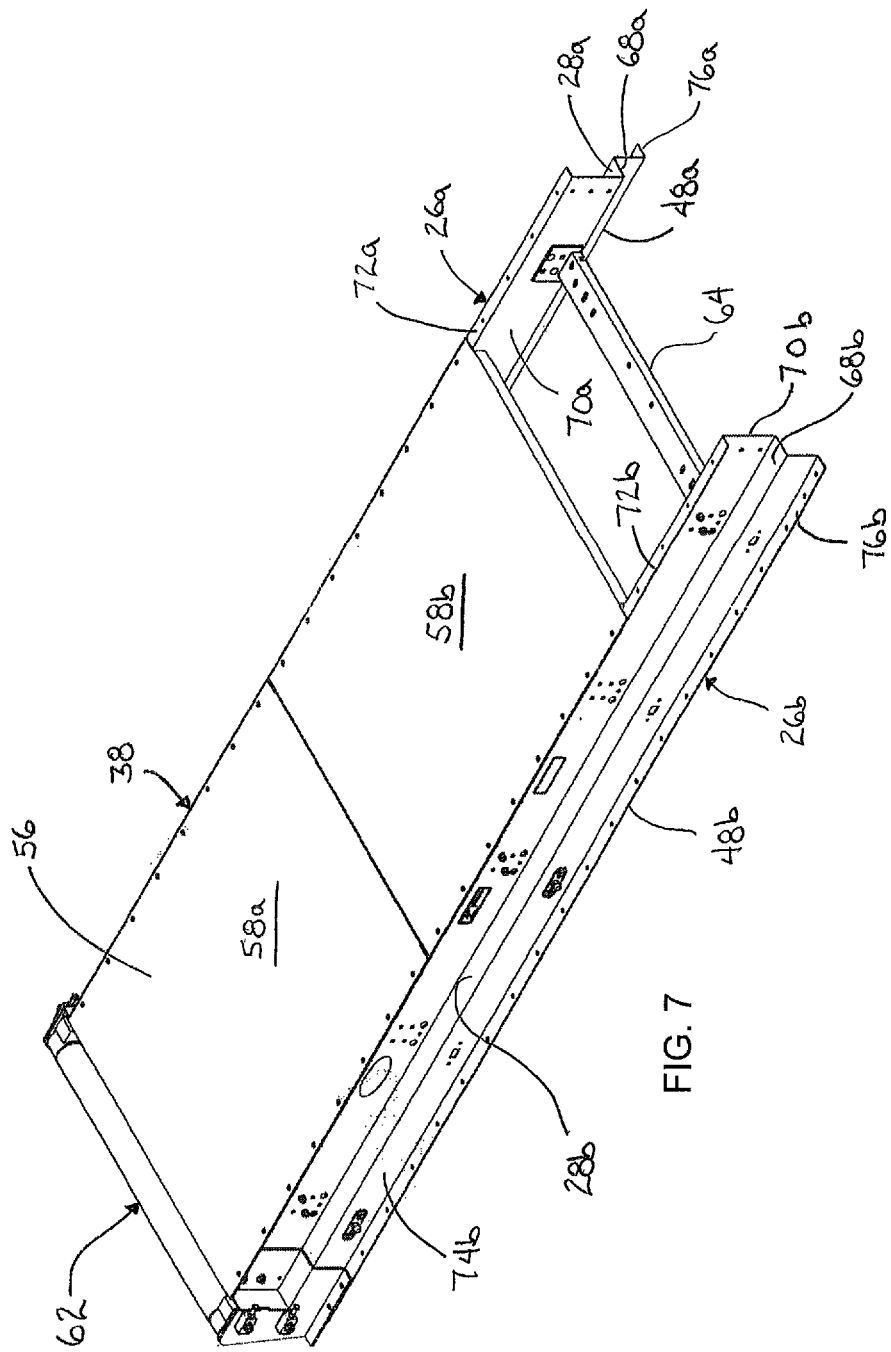
FIG. 7 is a perspective view of an intermediate section of the main conveyor of FIG. 1 shown separated from the conveyor.
Figure 7A:
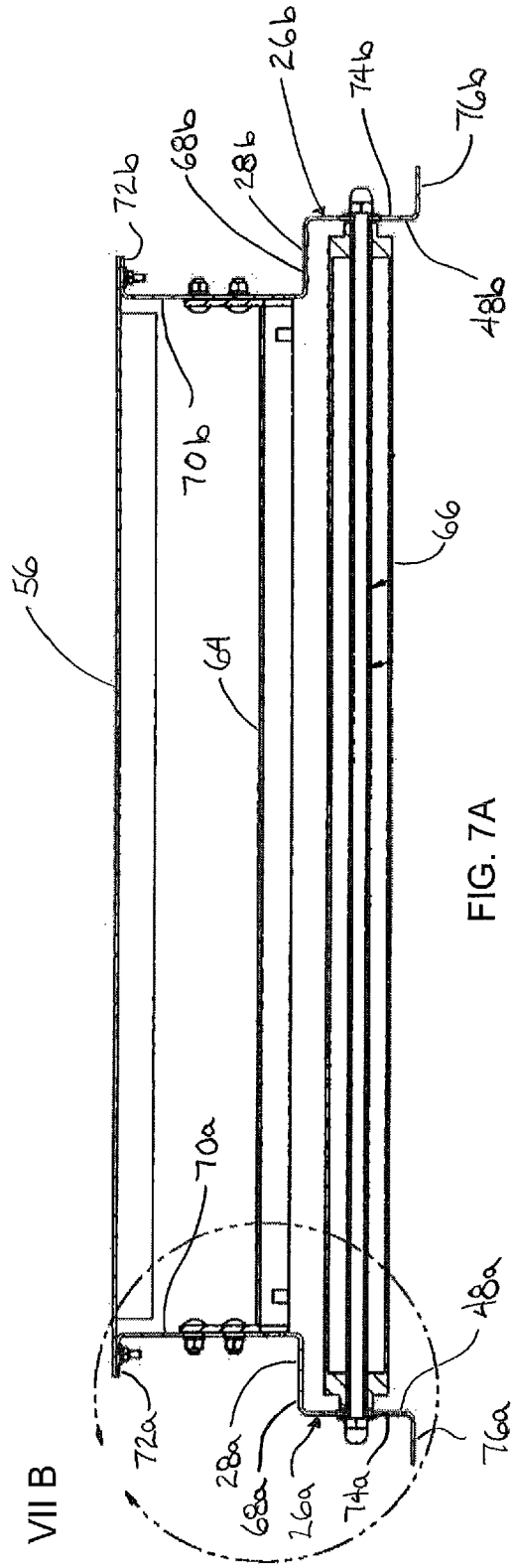
FIG. 7A is a cross-sectional view of the intermediate section of FIG. 7.
Figure 7B:
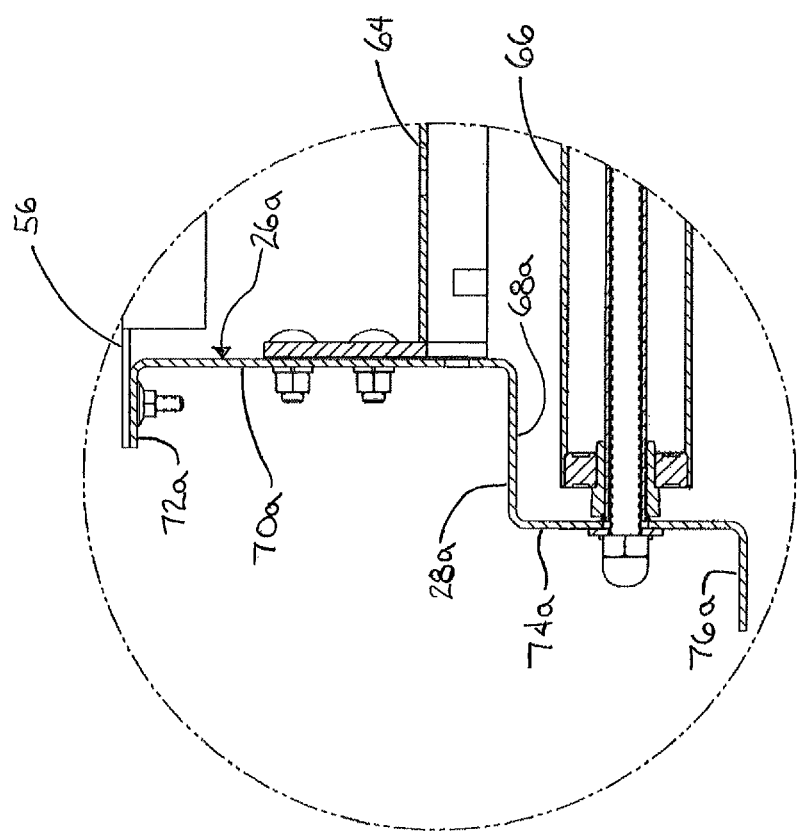
FIG. 7B is a partial close up view of the detail VIIB of FIG. 7.

First end section 38 is shown in FIGS. 7-7B. End pulley assembly 62 is affixed to side channels 48$a$, 48$b$ at one end of section 38, with panel members 58$a$, 58$b$ extending across side channels 48$a$, 48$b$ and being affixed thereto. Although only one is shown, section 38 further includes multiple cross members 64 extending between side channels 48$a$, 48$b$ beneath panel members 58$a$, 58$b$. As understood from FIG. 7A, section 38 further includes lower rollers 66 (one shown) over which belt 32 is moved beneath top surface 56 for returning belt 32 in the opposite direction in which belt 32 travels over top surface 56.

The profile of side channels 48$a$, 48$b$ is shown in FIGS. 7A and 7B. Support surfaces 28$a$, 28$b$ are defined by generally horizontal support walls 68$a$, 68$b$ that form the ledges upon which the discharge ends 30 of input conveyors 24 may be mounted. Generally vertical side surfaces defined by upper side walls 70$a$, 70$b$ extend upwardly from support walls 68$a$, 68$b$, respectively, with cross members 64 being mounted there between. Upper or top flanges 72$a$, 72$b$ extend generally horizontally outwardly from side walls 70$a$, 70$b$, respectively, where outwardly and inwardly as used herein are intended to be relative to the central conveyance path of conveyor 22. As best understood from FIG. 7B, top flanges 72$a$, 72$b$ form mounting surfaces to which panel members 58 are mounted, such as via threaded fasteners. Of note, both top flanges 72$a$, 72$b$ and support walls 68$a$, 68$b$ extend outwardly relative to side walls 70$a$, 70$b$, with support walls 68$a$, 68$b$ having a greater length than top flanges 72$a$, 72$b$ and thereby extending outwardly further than top flanges 72$a$, 72$b$.

Lower side walls 74$a$, 74$b$ extend generally vertically downwardly from support walls 68$a$, 68$b$, respectively, at the edge of support walls 68$a$, 68$b$ opposite the interconnection with upper side walls 70$a$, 70$b$. As shown, lower rollers 66 are mounted between lower side walls 74$a$, 74$b$. Bottom or lower flanges 76$a$, 76$b$ extend generally horizontally outwardly from side walls 74$a$, 74$b$. As shown in FIGS. 1 and 2A, supports or leg assemblies 78 are mounted to or joined with lower flanges 76$a$, 76$b$ to elevate conveyor 22.

By way of reference only and without limitation to the use of alternative sizes, orientations or constructions, in the illustrated embodiment support walls 68 have a horizontal length of approximately 2.75 inches, upper side walls 70 have a vertical length of approximately 6.5 inches, and lower side walls 74 have a vertical length of approximately 3.88 inches. Still further, top flanges 72 have a horizontal length of approximately 1.5 inches and bottom flanges have a horizontal length of approximately 1.86 inches.

Figure 8:
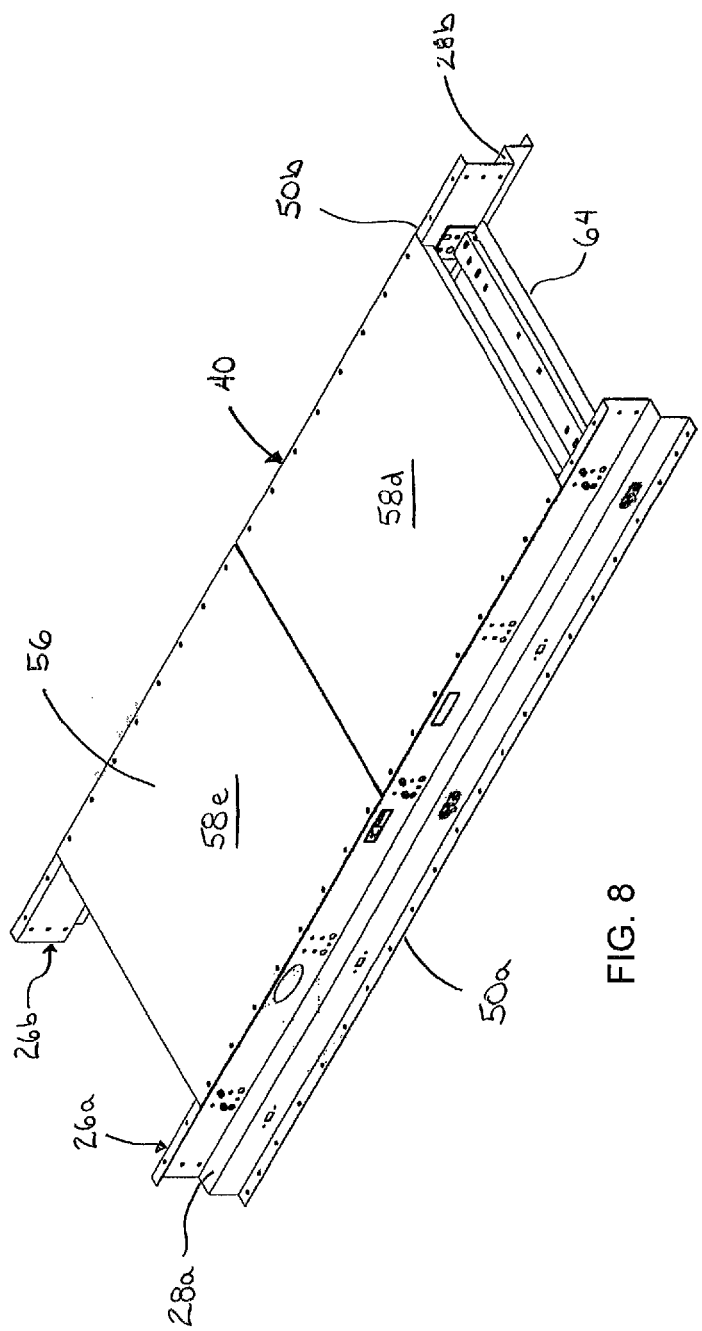
FIG. 8 is a perspective view of an end section of the main conveyor of FIG. 1 shown separated from the conveyor.
Figure 8A:
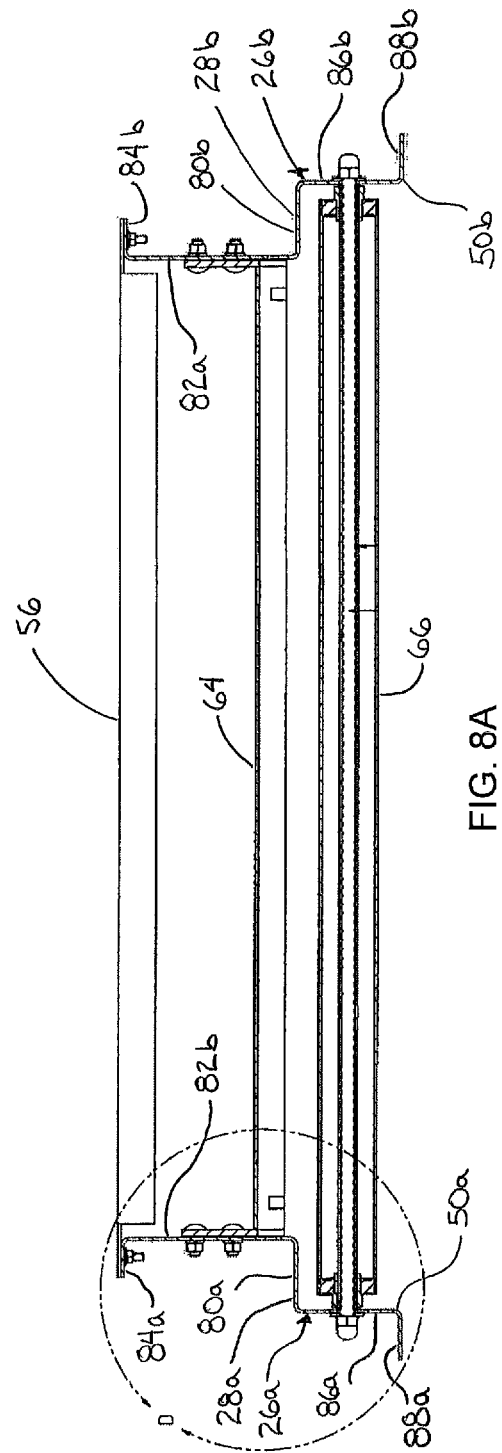
FIG. 8A is a cross-sectional view of the end section of FIG. 8.

Intermediate section 40 is shown in FIGS. 8 and 8A to include side channels 50$a$, 50$b$ with panel members 58$d$, 58$e$ being mounted there between. Cross members 64 (one shown) and lower rollers 66 (one shown) extend between side channels 50$a$, 50$b$. It should be understood that multiple cross members 64 and lower rollers 66 are employed with main conveyor 22. As understood from FIG. 8A, the cross-sectional profile of side channels 50a, 50b is substantially similar to that of side channels 48a, 48b discussed above. Thus, the support surfaces 28a, 28b are defined on side channels 50a, 50b as generally horizontal support walls 80a, 80b that form the ledges upon which the discharge ends 30 of input conveyors 24 may be mounted. Generally vertical side surfaces defined by upper side walls 82a, 82b extend upwardly from support walls 80a, 80b, respectively, with cross members 64 being mounted there between. Upper or top flanges 84a, 84b extend generally horizontally outwardly from side walls 82a, 82b, respectively, with top flanges 84a, 84b forming mounting surfaces to which panel members 58 are mounted. In like manner to side channels 48a, 48b, both top flanges 84a, 84b and support walls 80a, 80b extend outwardly relative to side walls 82a, 82b, with support walls 80a, 80b having a greater length than top flanges 84a, 84b and thereby extending outwardly further than top flanges 84a, 84b.

Lower side walls 86a, 86b extend generally vertically downwardly from support walls 80a, 80b, respectively, at the edge of support walls 80a, 80b opposite the interconnection with upper side walls 82a, 82b. As shown, lower rollers 66 are mounted between lower side walls 86a, 86b. Bottom or lower flanges 88a, 88b extend generally horizontally outwardly from side walls 86a, 86b, with supports 78 being mounted to lower flanges 88a, 88b to elevate conveyor 22.

It should be appreciated end section 44 is substantially similar to end section 38, and that intermediate section 42 is substantially similar to intermediate section 40. As noted, however, the various sections may be of alternative lengths from that shown or relative to each other as needed for a given application. Still further, a main conveyor may be constructed that has more or fewer intermediate sections as needed. Moreover, although the various side channels 48, 50, 52, 54 are shown in the illustrated embodiment as being formed as unitary members, it should also be appreciated that alternative constructions may be employed, such as forming from separate components.

Additional details regarding input conveyors 24a, 24b, 24c and 24d will now be discussed. Although FIGS. 1 and 2 disclose two input conveyors 24 on either side of main conveyor 22, it should be appreciated that more or fewer input conveyors 24 may be provided on either side, including none, depending on the needs of a particular installation. Input conveyors 24a-24d are shown to form acute angles with respect to the conveying orientation of main conveyor 22 as denoted by the arrow in FIG. 1. Input conveyors, however, may connect at alternative angles to a main conveyor relative to that shown in FIG. 1 and/or input conveyors may include a conventional belt conveyor portion leading to a roller conveyor portion adjacent the main conveyor. Still further, due to the similarities of input conveyors 24a, 24b, 24c, 24d relative to each other in the illustrated embodiment, it should be appreciated that the following discussion will focus on the exemplary input conveyor 24a shown in FIG. 3, where conveyors 24b and 24d comprise substantially mirror image structures relative to conveyor 24a.

Input conveyors 24 include a pair of side frame channels or rails 90, 92, with multiple rollers 94 extending there between, with the side rails 90, 92 being supported on leg assemblies 95 to elevate input conveyors 24. In the illustrated embodiment side rails 90, 92 comprise generally C-shaped channel members. A cross rail 96 additionally extends in an angled or non-perpendicular orientation between side rails 90, 92 at the ends of side rails 90, 92 where conveyors 24 mount to main conveyor 22, with cross rail 96 being shown in FIG. 3 between rollers 94 and shown in FIGS. 3A, 5 and 6. As shown in FIG. 3A, cross rail 96 is constructed as a generally planar member in the illustrated embodiment with multiple angled tabs 97 located along an elongate upper edge of the cross rail 96. One end of the forward most rollers 94 is mounted to each tab 97 to support the rollers there along. When mounted to conveyor 22, cross rails 96 are positioned on or at support surfaces 28a or 28b of side frames 26a, 26b, while tabs 97 are positioned adjacent the top flanges of the side frames 26a, 26b, such as adjacent top flanges 72a, 72b of conveyor section 38 or top flanges 84a, 84b of conveyor section 40. The rollers 94 connected to cross rail 96 may thus be positioned in close proximity to belt 32 of main conveyor. The conveying surface of the input conveyors 24 as defined by the vertically highest point of the rollers 94 is then slightly vertically elevated relative to the conveying surface or plane of belt 32. It should also be appreciated that the input conveyors may include fewer rollers relative to that shown on conveyor 24. For example, a roller conveyor input portion may only include the rollers connected between one side rail and the angled cross rail.

Discharge ends 30 of conveyors 24 include a bottom portion 98, which in the embodiment shown includes a portion of the bottom surfaces of the lower flanges 100 of the ends of side rails 90, 92, and may include the bottom surface of cross rail 96. As noted above, bottom portions 98 of the conveyors 24 are located on support surfaces 28a, 28b when joining input conveyors 24 with main conveyor 22. In particular, the ends of the lower vertical leg portions defining the C-shaped side rails 90, 92 may be mounted on support surfaces 28a, 28b. As such, surfaces 28a, 28b define a support for the ends of conveyors 24. Moreover, the distance between surfaces 28a, 28b and the top flanges of the side frames, such as flanges 72a, 72b and 84a, 84b accurately define the elevation to the top surface 56 of the conveyor 22. By correspondingly controlling the dimensions of the input conveyors 24, such as the height of the C-shaped side rails 90, 92 mounted on support surfaces 28a, 28b, the elevation of the belt 32 relative to the conveying surface of the input roller conveyors 24 can be accurately controlled.

Figure 6:
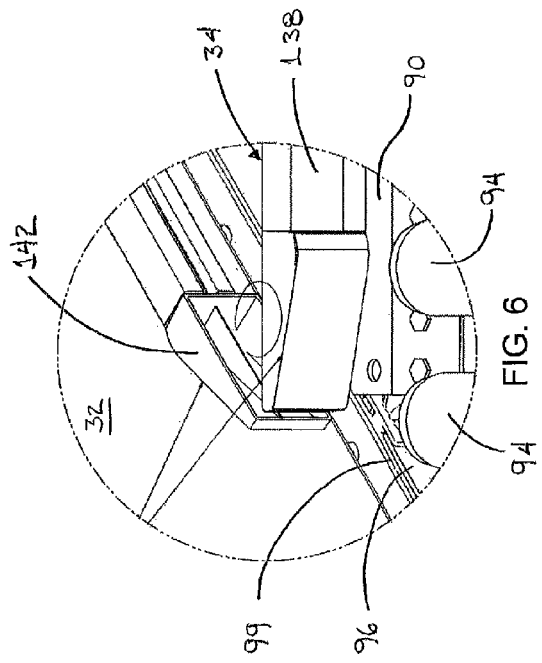
FIG. 6 is a partial close up perspective view of the detail VI of FIG. 3.
Figure 5:
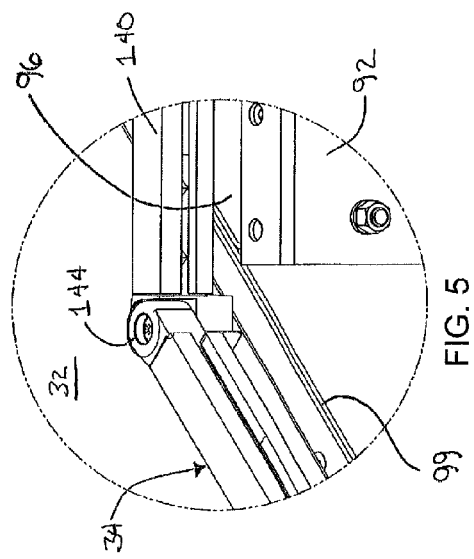
FIG. 5 is a partial close up perspective view of the detail V of FIG. 3.

As understood from FIGS. 5 and 6, cross rail 96 is aligned with an edge 99 of main conveyor 22, where in the illustrated embodiment edge 99 is defined by the edge of the top surface 56, as defined by the panel members 58, and in turn the edge of the side frames, such as first side frame 26a, by way of the top flange of the side channels, such as the edge of the top flange 72, 84 of side channels 48, 50, respectively. As such, the conveying surface of input conveyors 24 is accurately aligned with and made in substantial proximity to the conveying surface of main conveyor 22 to thereby provide substantial continuity of the conveying surfaces and minimize the transition between the conveyors 22, 24. In the illustrated embodiment the conveying surfaces as defined between the belt 32 and rollers 94 are separated by approximately two inches. Moreover, the vertically highest point of rollers 94 is only slightly raised relative to the upper surface of belt 32, such as approximately ⅛ inch, thereby minimizing the vertical drop experienced by items being conveyed from input conveyors 24 to belt conveyor 22.

Input conveyors 24 are aligned at a non-perpendicular angle relative to main conveyor 22 with a sub-set of rollers 94a being provided that extend between side rail 92 and cross rail 96 and have progressively shorter axial lengths for delivering items from conveyor 24 to conveyor 22. The rollers 94 may be powered or unpowered. Side rails 90, 92 further include lower flanges 100 for receiving leg assemblies 95.

Reference will now be made to FIGS. 1-6 in describing guard assembly 34. Guard assembly 34 includes guard rails or guard rail assemblies 110a, 110b, 110c along a first side of main conveyor 22, and corresponding guard rail assemblies 110d, 110e, 110f along a second side of main conveyor 22. Guard assembly 34 further includes guard rails or guard rail assemblies 112, 114 located along the sides of input conveyors 24 that are connected with respective guard rail assemblies 110 of main conveyor 22. Guard rail assemblies 110a, 110b, 110c are substantially similar to each other, as are guard rail assemblies 110d, 110e, 110f, but with varying lengths. Still further, guard rail assemblies 110a, 110b, 110c are substantially mirror image structures relative to guard rail assemblies 110d, 110e, 110f, respectively. As shown in FIG. 1, openings 116 are formed in guard assembly 34 at the connection of input conveyors 24 with main conveyor 22.

Due to the similarities of guard rail assemblies 110a-110f, details regarding their construction will be made with reference to the exemplary cross sectional guard rail assembly 110 disclosed in FIG. 4. Guard rail assembly 110 includes a guard member 118 formed as an elongate guard rail member 120 having a generally vertical guard surface 122 that functions to inhibit items being conveyed on belt 32 from falling off conveyor 22 if such items come into contact with surface 122. Guard rail member 120 is mounted to conveyor 22, and in particular is mounted to the side channels forming side frame 26, by way of an upstanding member or bracket that is constructed as post 124 in the illustrated embodiment. Post 124 is mounted to side frame 26, and in the embodiment shown is affixed by way of a threaded fastener 126 to a top flange 72 of side frame 26. Guard rail assembly 110 further includes a guide member, which in the embodiment shown comprises a bearing or roller 36 mounted to post 124 such that the axis of rotation of roller 36 is perpendicularly oriented relative to the direction of travel of belt 32. Multiple posts 124, with rollers 36 mounted thereto, may be disposed along the two sides of the main conveyor 22 for supporting the guard member 118 vertically above top surface 56 and guiding belt 32. Belt 32 is normally not in contact with rollers 36, but should there be deflection in belt 32, such as from a side load imparted thereto, belt 32 will contact rollers 36 for inhibiting belt 32 from mis-tracking.

Figure 4:
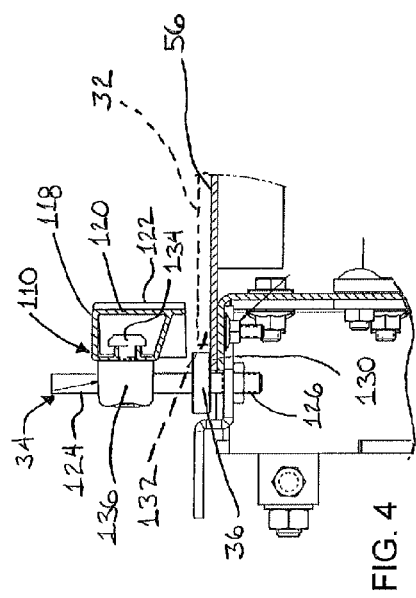
FIG. 4 is a partial cross-sectional view of the guard assembly located along the main conveyor of FIG. 1.

As further understood from FIG. 4, guard surface 122 is positioned above both top surface 56 and belt 32, as well as inwardly relative to top surface 56 and the edge 130 of belt 32. Both the edge 130 of top surface 56 and the edge 132 of belt 32 additionally extend outwardly beyond a plane defined by the upper side wall 70 of side frame 26. Thus, discharge end 30 of an input conveyor 24 may be mounted in substantial proximity to belt 32 of conveyor 20 when assembled together, thereby aiding in the transition of items conveyed from input conveyors 24 onto main conveyor 22. As also understood from FIG. 4, guard rail members 120 include a fastener 134 that is received in or by a guard mount 136 that is secured on post 124 for retaining the guard rail member 120 in the desired position.

Figure 3:
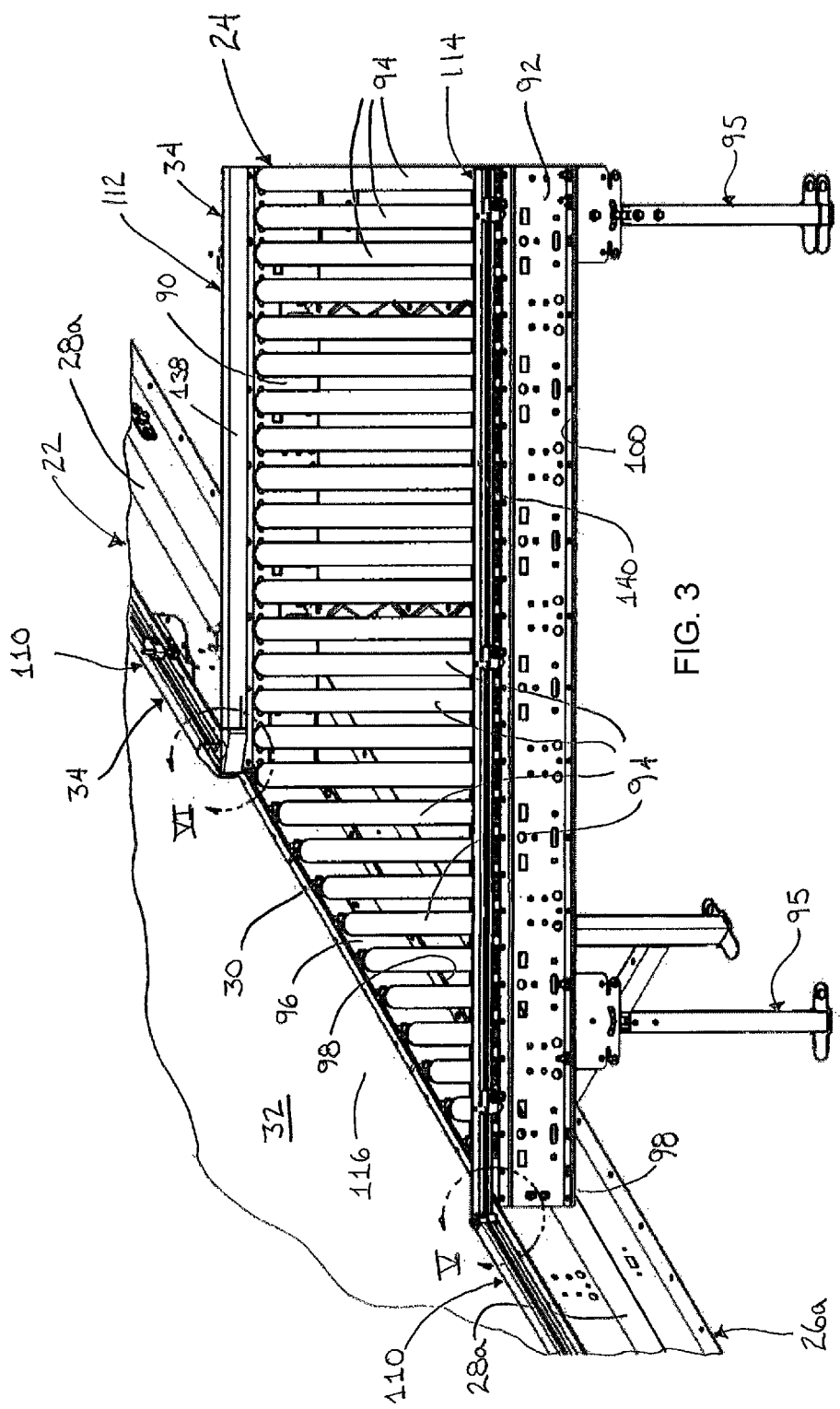
FIG. 3 is a partial perspective view of the connection of an input conveyor with the main conveyor of FIG. 1.
Figure 3A:
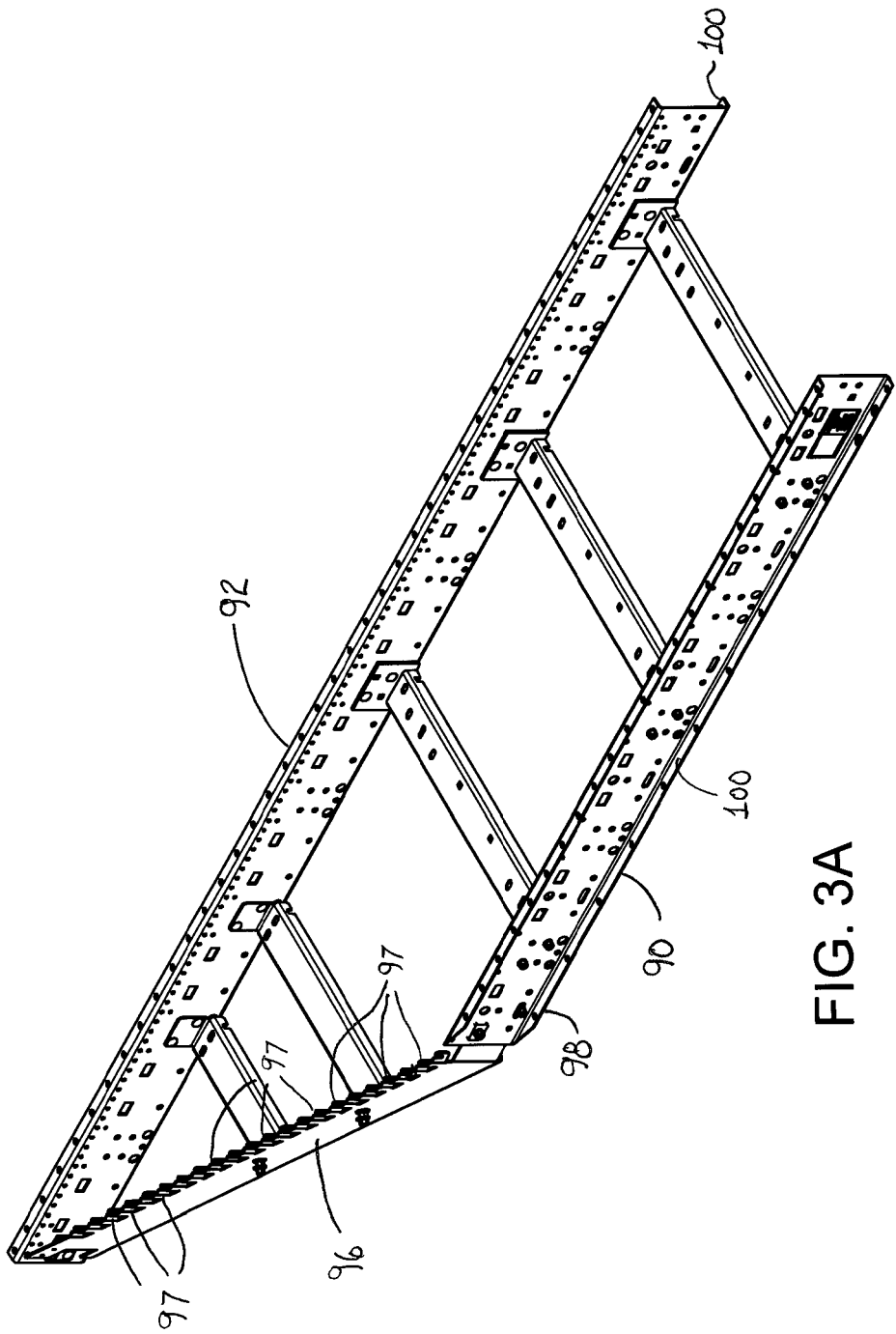
FIG. 3A is an overhead perspective view of the framework of one of the input conveyors of the conveyor assembly of FIG. 1 with the rollers removed for clarity.

With further reference to FIGS. 3, 5 and 6, guard rail assemblies 112, 114 on input conveyors 24 include guard rail members 138, 140, respectively, that are joined with the guard rail members 120 of the guard rail assemblies 110 on main conveyor 22 by way of a flared fender assembly 142 and a knuckle assembly 144.

Reference is now made to FIGS. 9 and 10 regarding end pulley assemblies 62. Each end pulley assembly 62 includes a top roller 150 and a bottom roller 152 mounted between support brackets 154, 156, with a pair of end guards 158 located at each bracket 154, 156. Four end adjusters 160 are provided corresponding to the two ends of top roller 150 and the two ends of bottom roller 152 for adjusting the squareness of the end pulley assembly 62 relative to the travel of belt 32 there over.

Figure 7C:
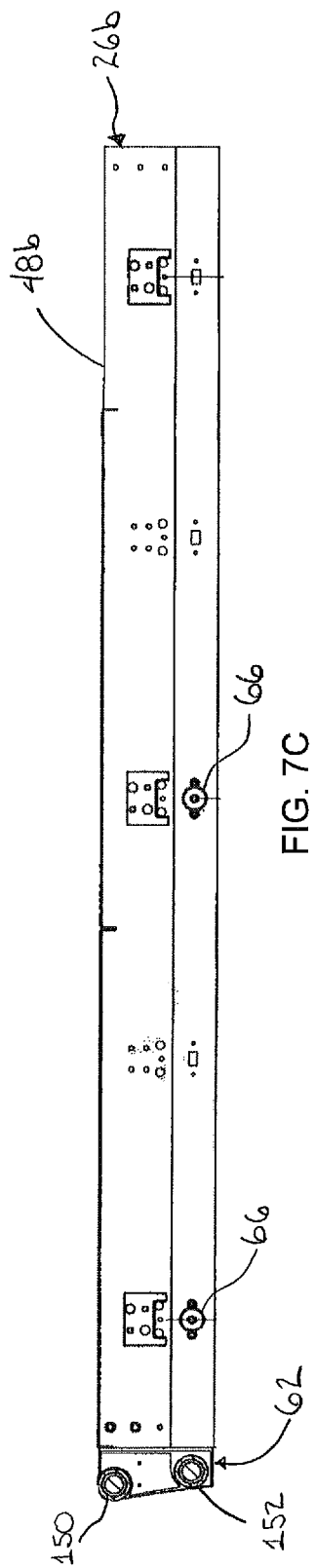
FIG. 7C is a side view of the intermediate section of FIG. 7.

Top roller 150 is oriented vertically higher relative to bottom roller 152. In particular, top roller 150 and bottom roller 152 have parallel axes of rotation with the axis of rotation of top roller 150 being positioned vertically higher than the axis of rotation of bottom roller 152. As understood from FIG. 7C, top roller 150 is vertically positioned relative to top surface 56 whereby during rotation of top roller 150 belt 32 exits or enters rotation about top roller 150 in substantially the plane in which the belt 32 moves for conveyance of items. Moreover, the axis of rotation of top roller 150 is positioned vertically higher than the axis of rotation of bottom roller 152 by an amount greater than the combined radii of top roller 150 and bottom roller 152, thereby creating a space 162 (FIG. 10) between top roller 150 and bottom roller 152. With further reference to FIG. 7C it is observed that top roller 150 extends outwardly further than bottom roller 152 relative to the plane in which belt 32 travels for conveyance of items, with top roller 150 being positioned outwardly further bottom roller 152 by an amount less than the combined radii of top roller 150 and bottom roller 152.

As understood from FIG. 10, belt 32 is spaced by a distance 164 when traveling about end pulley assembly 62. It should be appreciated that if a single roller having a diameter equal to distance 164 were employed, the single roller would have a significantly greater radius than the radius of top roller 150. Accordingly, if such an alternative conveyor were operatively aligned with another conveyor a significant gap would exist in the conveying plane of the two associated belts. In contrast, by utilizing a pair of rollers 150, 152, with the upper roller 150 having a smaller diameter than the distance 164, the conveyor 22 may be operatively aligned with another conveyor to thereby minimize the gap in the conveying plane of the two associated belts.

Brackets 154, 156 include mounting holes (not shown) for receiving top and bottom rollers 150, 152, with end adjusters 160 being mounted thereto. Brackets 154, 156 further include flanges 170, 172, respectively, for connection with supports 78. Although shown in connection with a merge assembly conveyor system, it should be appreciated that end pulley assemblies 62 may be employed with belt conveyors in alternative installations.

Figure 11:
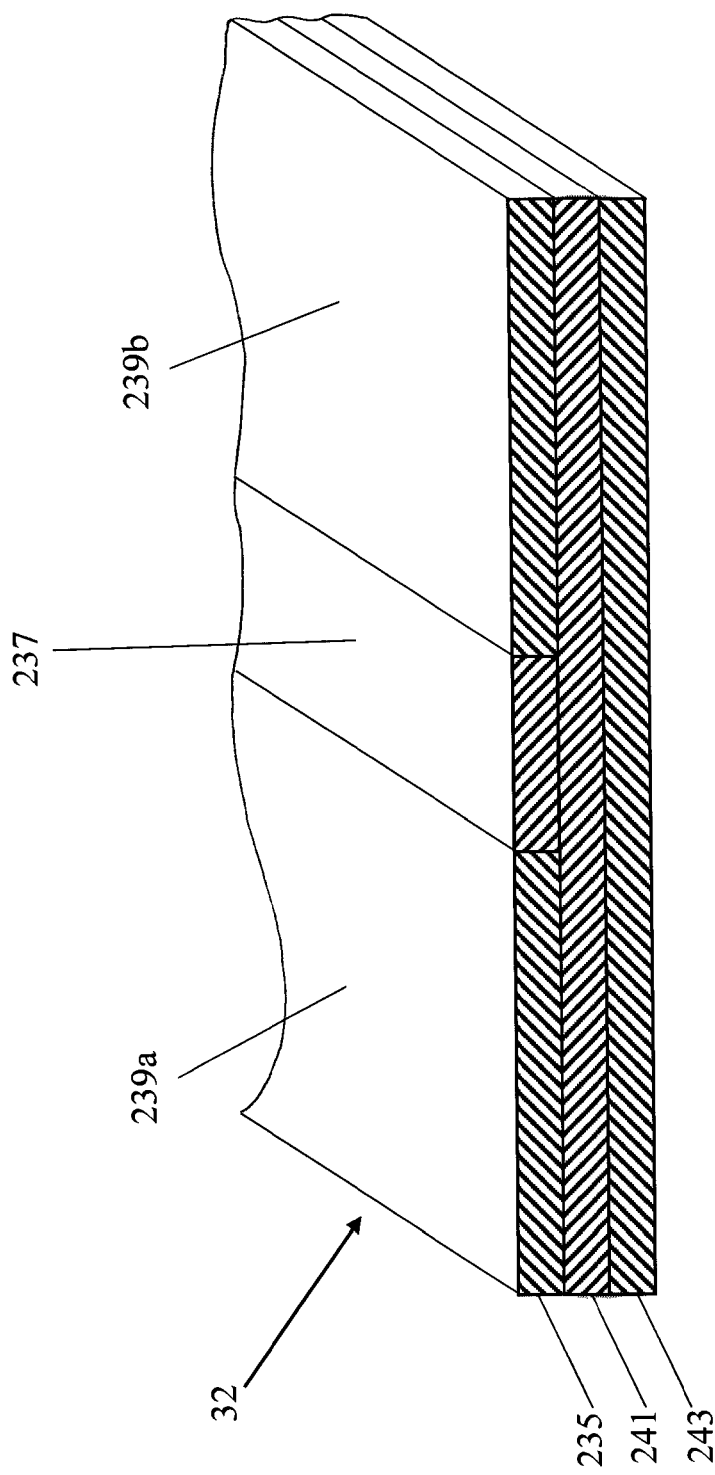
FIG. 11 is a partial cross-sectional perspective view of the conveyor belt of FIG. 1 removed from the main conveyor.

With reference now to FIGS. 1 and 11, conveyor assembly 20 is shown in FIG. 1 to include endless conveyor belt 32 disposed on main conveyor 22, as described above. As understood from FIG. 11, belt 32 includes an upper or top layer 235 having a portion 237 that is formed from an alternative material relative to side portions 239a, 239b of top layer 235. Portion 237 is constructed to provide a higher coefficient of friction relative to side portions 239a, 239b such that portion 237 operates to inhibit or stop the cross belt movement of items, such as packages, discharged from input conveyors 24 onto main conveyor 22. In addition, portion 237 further aids in aligning incoming items on, at or about portion 237. This occurs as a result of an incoming item being discharged onto belt 32 and the forward portion of the incoming item initially contacting portion 237 such that it is slowed or stopped relative to the rearward portion, which will then rotate as a result of its own inertia or momentum. Thus, portion 237 aids in inhibiting or preventing items from sliding beyond the center of belt 32 when they are input to or discharged onto belt 32, as well as aligning items thereon. Belt 32 may advantageously be employed in high speed applications, such as when belt 32 travels greater than approximately 540 feet per minute.

Portion 237 is constructed to provide a higher coefficient of friction relative to side portions 239a, 239b such as by portion 237 being constructed with a greater portion of rubber based products relative to side portions 239a, 239b. Coefficient of friction is a comparative ratio of the friction between two bodies and their engagement force. Thus, as understood in the present description, center portion 237 is understood to provide a comparatively higher coefficient of friction relative to side portions 239a, 239b, such as with respect to the lateral movement of an item across belt 32 when discharged onto belt 32. Alternatively expressed, the surface of portion 237 provides greater frictional surface resistance compared to the surfaces of side portions 239a, 239b. In the illustrated embodiment, for example, the coefficient of friction ($\mu$) for portion 237 is approximately 1.2 relative to cardboard the coefficient of friction ($\mu$) for side portions 239a, 239b is approximately 0.25 relative to cardboard. It should be understood, however, that alternatively constructed belts may be provided wherein the different sections provide higher or lower surface friction relative to those of belt 32.

In the illustrated embodiment belt 32 comprises a multilayer belt, with belt 32 being constructed as a three-ply belt having a middle layer 241 and a lower or bottom layer 243 in addition to top layer 237. Bottom layer 243 is constructed to provide less surface resistance than portion 237 to promote movement of belt 32 over the slider bed top surface 56 of belt conveyor 22.

Portion 237 is shown as a central or middle portion relative to side portions 239a, 239b in the embodiment shown in FIG. 11, but could alternatively be disposed toward or at one side or the other of belt 32. Belt 32 may be constructed by removing a portion of the top layer of a belt initially having a unitary top layer, and inserting into the removed area portion 237. Portion 237 may then be vulcanized to middle layer 241 and adjacent side portions 239a, 239b that remain from the initial unitary top layer. A belt having a multi portion upper layer with differing frictional surface resistances, such as belt 32, may be constructed in varying sized and configurations. For example, portion 237 may be constructed to be in the range of approximately six to eight inches in width relative to the lateral orientation of belt 32, where belt 32 may have an overall width of, for example, 32 or 38 inches. It should be further understood that alternative belts may be used with conveyor assembly 20, and that belts constructed in accordance with belt 32 may be used on alternative conveyor assemblies.

The conveyor assembly 20 enables input conveyors 24 to be accurately mounted in close proximity to the main conveyor 22, by way of the side frames 26a, 26b having support surfaces 28a, 28b, thereby promoting the conveyance of items form the input conveyors 24 onto the main conveyor 22. As understood with reference to the illustrated embodiment, the side frames 26a, 26b are configured from multiple elongate side channels having the support surface integrally formed therein. Moreover, a belt conveyor configured with the end pulley assemblies in accordance with another aspect of the invention enables the conveyor to be axially aligned with another conveyor with a minimized gap in the conveying plane of the conveyors.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A conveyor assembly, said conveyor assembly comprising:
    a main conveyor comprising a belt conveyor having a top surface and a belt with said belt having a first edge and a second edge defining a width of said belt and being moveable over said top surface, said main conveyor further comprising a first side frame and a second side frame, said first side frame including a side portion and a support surface, said support surface extending laterally outward beyond an edge of said top surface with said side portion extending upwardly relative to said support surface, wherein said first side frame further includes a generally horizontally oriented flange located above said side portion, and wherein said top surface extends over said flange; and
    an input conveyor defining a conveying surface and having a discharge end;
    said input conveyor being mounted to said first side frame of said main conveyor with said discharge end positioned on said support surface.

2. The conveyor assembly of claim 1, wherein said discharge end of said input conveyor includes a bottom portion, and wherein said bottom portion is positioned on said support surface.

3. The conveyor assembly of claim 2, wherein said input conveyor includes a pair of side rails and said side rails include said bottom portion.

4. The conveyor assembly of claim 1, wherein said support surface comprises a support wall defining a ledge.

5. The conveyor assembly of claim 4, wherein said ledge comprises an elongate ledge and said support surface is generally horizontally oriented.

6. The conveyor assembly of claim 4, wherein said side portion comprises a side wall with said side wall being oriented generally orthogonally relative to said support wall.

7. The conveyor assembly of claim 1, wherein said flange extends outwardly relative to said side portion and said top surface extends outwardly beyond a plane defined by said side portion of said first side frame.

8. The conveyor assembly of claim 7, wherein said first edge of said belt extends outwardly beyond a plane defined by said side portion of said first side frame.

9. The conveyor assembly of claim 1, wherein said first side frame comprises a plurality of elongate side channels.

10. The conveyor assembly of claim 1, wherein said input conveyor comprises a roller conveyor oriented at a non-perpendicular angle relative to said main conveyor with said discharge end including a first side rail and a second side rail with a plurality of rollers with progressively shorter axial lengths extending between said first side rail and said second side rail.

11. The conveyor assembly of claim 1, further including a guard assembly mounted at and extending with said first side frame, said guard assembly including an opening at said discharge end of said input conveyor, with said guard assembly including a guard member located inwardly above said top surface of said main conveyor and inwardly above said first edge of said belt.

12. The conveyor assembly of claim 11, wherein said guard assembly further includes a guide member against which said first edge of said belt can contact.

13. The conveyor assembly of claim 1, wherein said second side frame includes a side portion and a support surface, said support surface of said second side frame extending laterally outward beyond an opposite edge of said top surface with said side portion of said second side frame extending upwardly relative to said support surface of said second side frame, and wherein said support surface of said second side frame is configured to have a discharge end of another input conveyor positioned thereon.

14. The conveyor assembly of claim 1, wherein said belt has a first portion joined together with a second portion, with said first portion and said second portion comprising a conveying surface configured to support items for conveyance on said main conveyor, and wherein said first portion provides greater frictional surface resistance than said second portion.

15. The conveyor assembly of claim 14, wherein said belt further includes a third portion joined together with said first portion, and wherein said first portion provides greater frictional surface resistance than said third portion and wherein said first portion is located between said third and second portions.

16. The conveyor assembly of claim 14, wherein said belt comprises a multi-layer belt having a top layer and a second layer beneath said top layer with said top layer comprising said first portion and said second portion.

17. The conveyor assembly of claim 1, wherein said main conveyor includes an input end and a discharge end, and wherein at least one of said input end and said discharge end include an end pulley assembly around which said belt travels to enable said belt to travel in a direction opposite that from which it enters said end pulley assembly, and wherein said end pulley assembly comprises a top roller and a bottom roller having parallel axes of rotation with the axis of rotation of said top roller being positioned vertically higher than the axis of rotation of said bottom roller.

18. The conveyor assembly of claim 1, wherein said top surface defines a slider bed comprising one or more panel members.

19. A conveyor assembly, said conveyor assembly comprising:
   a main conveyor comprising a belt conveyor having a top surface and a moveable belt with said belt having a first edge and a second edge defining a width of said belt and being moveable over said top surface, said main conveyor further comprising a first side frame and a second side frame, said first side frame including a side portion and a support surface, said support surface comprising a wall defining a ledge extending laterally outward beyond an edge of said top surface with said side portion extending upwardly relative to said support surface, wherein said first side frame further includes a generally horizontally oriented flange located above said side portion, and wherein said top surface extends over said flange; and
   an input conveyor defining a conveying surface and having a discharge end with said discharge end including a bottom portion;
   said input conveyor being mounted to said first side frame of said main conveyor with said bottom portion of said discharge end positioned on said ledge of said support surface.

20. The conveyor assembly of claim 19, wherein said support wall comprises an elongate ledge and is generally horizontally oriented, and said side portion comprises a side wall with said side wall being oriented generally orthogonally relative to said support wall.

21. The conveyor assembly of claim 20, wherein said input conveyor includes a pair of side rails and said side rails include said bottom portion.

22. The conveyor assembly of claim 19, wherein said second side frame includes a side portion and a support surface, said support surface of said second side frame comprising a wall defining a ledge extending laterally outward beyond an opposite edge of said top surface with said side portion of said second side frame extending upwardly relative to said support surface of said second side frame, and wherein said ledge of said second side frame is configured to have a discharge end of another input conveyor positioned thereon.

23. A conveyor assembly, said conveyor assembly comprising:
   a main conveyor having a first side frame and a second side frame, said first side frame including a side portion and a support surface, wherein said support surface comprises a support wall defining a ledge and said side portion comprises a side wall, wherein said main conveyor comprises a belt conveyor and includes a top surface and a moveable belt with said top surface extending between said first side frame and said second side frame and said belt being moveable over said top surface and having a first edge and a second edge defining a width of said belt, and wherein said support surface is vertically lower than said top surface and extends outwardly from said first side frame beyond said top surface, wherein said first side frame further includes a flange located above said side portion, and wherein said top surface extends over said flange; and
   an input conveyor having a discharge end, said discharge end including a bottom portion;
   said discharge end of said input conveyor being mounted to said first side frame of said main conveyor with said bottom portion positioned on said ledge, wherein said input conveyor comprises a roller conveyor oriented at a non-perpendicular angle relative to said main conveyor with said discharge end including a first side rail and a second side rail with a plurality of rollers with progressively shorter axial lengths extending between said first side rail and said second side rail.

24. A conveyor assembly, said conveyor assembly comprising:
   a main conveyor comprising a belt conveyor having a top surface and a belt with said belt having a first edge and a second edge defining a width of said belt and being moveable over said top surface, said main conveyor further comprising a first side frame and a second side frame; and
   an input conveyor defining a conveying surface and having a discharge end;
   said input conveyor being configured to deliver items to said belt conveyor;
   wherein said belt has a first portion joined together with a second portion, with said first portion and said second portion comprising a conveying surface configured to support items for conveyance on said main conveyor, and wherein said first portion provides greater frictional surface resistance than said second portion.

25. The conveyor assembly of claim 24, wherein said belt comprises a multi-layer belt having a top layer and a second layer beneath said top layer with said top layer comprising said first portion and said second portion.

26. The conveyor assembly of claim 24, wherein said belt further includes a third portion joined together with said first portion, and wherein said first portion provides greater frictional surface resistance than said third portion and wherein said first portion is located between said third and second portions.

27. The conveyor assembly of claim 26, wherein said belt comprises a multi-layer belt having a top layer and a second layer beneath said top layer with said top layer comprising said first portion and said second portion and said third portion.

28. The conveyor assembly of claim 26, wherein said second portion and said third portion comprise side portions, and wherein said first portion comprises a middle portion, and wherein one of said side portions define said first edge of said belt and the other said side portion defines said second edge of said belt.

29. The conveyor assembly of claim 24, wherein said top surface defines a slider bed comprising one or more panel members.

30. The conveyor assembly of claim 24, wherein said second portion comprises a side portion with said side portion defining one of said first edge or said second edge of said belt.

31. A conveyor assembly, said conveyor assembly comprising:

a main conveyor comprising a belt conveyor having a top surface and a belt with said belt having a first edge and a second edge defining a width of said belt and being moveable over said top surface, said main conveyor further comprising a first side frame and a second side frame;

an input conveyor defining a conveying surface and having a discharge end, said input conveyor being configured to deliver items to said belt conveyor; and a guard assembly mounted at and extending with said first side frame, said guard assembly including an opening at said discharge end of said input conveyor, with said guard assembly including a guard member located inwardly above said top surface of said main conveyor and inwardly above said first edge of said belt, wherein said guard assembly further includes a guide member against which said first edge of said belt can contact.

32. The conveyor assembly of claim 31, wherein said guide member comprises a roller having an axis of rotation that is perpendicularly oriented relative to the direction of travel of said belt.

* * * * *